(12) United States Patent
Jourdan et al.

(10) Patent No.: US 7,590,516 B2
(45) Date of Patent: Sep. 15, 2009

(54) METHOD FOR QUANTIFYING UNCERTAINTIES RELATED TO CONTINUOUS AND DISCRETE PARAMETERS DESCRIPTIVE OF A MEDIUM BY CONSTRUCTION OF EXPERIMENT DESIGNS AND STATISTICAL ANALYSIS

(75) Inventors: Astrid Jourdan, Idron (FR); Isabelle Zabalza-Mezghani, Rueil Malmaison (FR); Emmanuel Manceau, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 691 days.

(21) Appl. No.: 10/404,049

(22) Filed: Apr. 2, 2003

(65) Prior Publication Data

US 2003/0220775 A1 Nov. 27, 2003

(30) Foreign Application Priority Data

Apr. 2, 2002 (FR) .................................. 02 04109

(51) Int. Cl.
*G06G 7/50* (2006.01)
*G06G 7/48* (2006.01)
(52) U.S. Cl. ................................ 703/10; 703/9; 703/18
(58) Field of Classification Search ................... 703/18, 703/9, 10
See application file for complete search history.

(56) References Cited

U.S. PATENT DOCUMENTS 5,838,634 A * 11/1998 Jones et al. ................. 367/73
6,321,840 B1 * 11/2001 Billiter et al. ............... 166/268

2004/0254734 A1 * 12/2004 Zabalza-Mezghani et al. 702/13

OTHER PUBLICATIONS

C. Leon-Velarde, et al, Selecting Optimum Ranges of Technological Alternatives by Using Response Surface Designs in Systems Analysis, 1997.*

Statsoft, Experimental Design (Industrial DOE), 1997, http://www.statsoft.com/textbook/stexdes.html.*

Peter Corvi et al, "Reservoir Characterization Using Expert Knowledge, Data and Statistics", Oilfield Review, Jan. 1992, pp. 25-39.*

Woodside et al, Acoustic Properties From Logs and Discrete Measurements (Sites 966 and 967) on Eratosthenes Seamount: Controls and Ground Truth, Robertson, A.H.F., Emeis, K.-C., Richter, C., and Camerlenghi, A. (Eds.), 1998, Proceedings of the Ocean Drilling Program, Scientific Results, vol. 160.*

Gilles Guerin et al, Optimization of Reservoir Simulation and Petrophysical Characterization in 4D Seismic, 2000 Offshore Technology Conference held in Houston, Texas, 1D4 May 2000.*

(Continued)

*Primary Examiner*—Kamini S Shah
*Assistant Examiner*—David Silver
(74) *Attorney, Agent, or Firm*—Antonelli, Terry, Stout & Kraus, LLP.

(57) ABSTRACT

A method for quantifying uncertainties related to continuous and discrete (qualitative) parameters descriptive of a medium such as an underground zone and/or for managing the selection of a scenario from a series of possible scenarios relative to this medium, by construction of experiment designs and results analysis suited to the experiment designs constructed.

40 Claims, 7 Drawing Sheets

OTHER PUBLICATIONS

Luigi Saputelli et al, Integration of Computer-Aided High-Intensity Design with Reservoir Exploitation of Remote and Offshore Locations, SPE International Oil and Gas Conference and Exhibition in China held in Beijing, China, Nov. 7-10, 2000, SPE 64621.*

Smith et al, The Road Ahead to Real-Time Oil & Gas Reservoir Management, Transactions of the Institution of Chemical Engineers: Chemical Engineering Research and Design, vol. 76A, pp. 1-32, 1998. (Awarded the 1998 Hutchison medal by the Institution of Chemical Engineers.).*

C. Leon-Velarde, et al, Selecting Optimum Ranges of Technological Alternatives by Using Response Surface Designs in Systems Analysis, 1997.*

C. F. J. Wu and Yuan Ding, Construction of response surface designs for qualitative and quantitative factors, Journal of Statistical Planning and Inference, vol. 71, Issues 1-2, Aug. 1, 1998, pp. 331-348. (http://www.sciencedirect.com/science/article/B6V0M-3V5CVRT-T/2/1d2019dd798b40cc18f5a780c8e8506e).*

Cox, D. R. (1984), Present Position and Potential Developments: Some Personal Views: Design of Experiments and Regression, J. of Royal Statistical Society, Ser. A, 147, pp. 306-315.

Draper, N. R. and John, J.A. (1988), Response-Surface Designs for Quantitative and Qualitative Variables, Technometric, Nov. 1988 30(4), pp. 423-428.

Wu, C.F.J. and Ding Y. (1998), Construction of Response Surface Designs for Qualitative and Quantitative Factors, J. of Planning and Inferences, 71, pp. 331-348.

Zabalza I., Dejean J.P., Collombier D. (1998), Prediction and Density Estimation of a Horizontal Well Productivity Index Using Generalized Linear Model, $6^{th}$ European Conference on the Mathematics of Oil Recovery (ECMOR VI), Peebles, Sep. 8-11, 1998 (8 pgs.).

DeJean J.-P., Blanc G. (1999), Managing Uncertainties on Production Predictions Using Integrated Statistical Methods, SPE 56696, SPE Annual Technical Conference and Exhibition, Houston, Oct. 3-6, 1999.

* cited by examiner

| Terms of the model | N=30 P30 Global model | N=30 P30 Marginal models | N=42 C42 | N=46 P46 Global model | N=46 P46 Marginal models | N=58 C58 |
|---|---|---|---|---|---|---|
| x1 | | x2x6 ; x3x5 | x2x6 ; x3x5 | | | |
| x2 | | x1x6 ; x4x5 | x1x6 ; x4x5 | | | |
| x3 | | x1x5 ; x4x6 | x1x5 ; x4x6 | | | |
| x4 | | x2x3 ; x5x6 | x2x3 ; x5x6 | | | |
| x5 | | x1x3 ; x2x4 | x1x3 ; x2x4 | | | |
| x6 | | x1x2 ; x3x4 | x1x2 ; x3x4 | | | |
| x1x2 | zx6 ; x3x4 | | | | x3x4 | x3x4 |
| x1x3 | zx5 ; x2x4 | | | | x2x4 | x2x4 |
| x1x4 | x2x3 ; x5x6 | x2x3 ; x5x6 | x2x3 ; x5x6 | | x2x3 ; x5x6 | x2x3 ; x5x6 |
| x1x5 | zx3 ; x4x6 | | | | x4x6 | x4x6 |
| x1x6 | zx2 ; x4x5 | | | | x4x5 | x4x5 |
| x2x3 | | | | x5x6 | | |
| x2x4 | | | | | | |
| x2x5 | zx4 ; x3x6 | | | x3x6 | x3x6 | x3x6 |
| x2x6 | zx1 ; x3x5 | | | x3x5 | x3x5 | x3x5 |
| x3x4 | | | | | | |
| x4x5 | | | | | | |
| x4x6 | | | | | | |
| x1z, x2z, x3z, x4z, x5z, x6z | | | | | | |
| $x1^2$ | | | | | $x2^2 ; x3^2$ | |
| $x2^2$ | | | | | | |
| $x3^2$ | | | | | | |
| $x4^2$ | | | | $x5^2 ; x6^2$ | | |
| $x5^2$ | | | | | | |
| $x6^2$ | | | | | | |

FIG.5A
FIG.5B
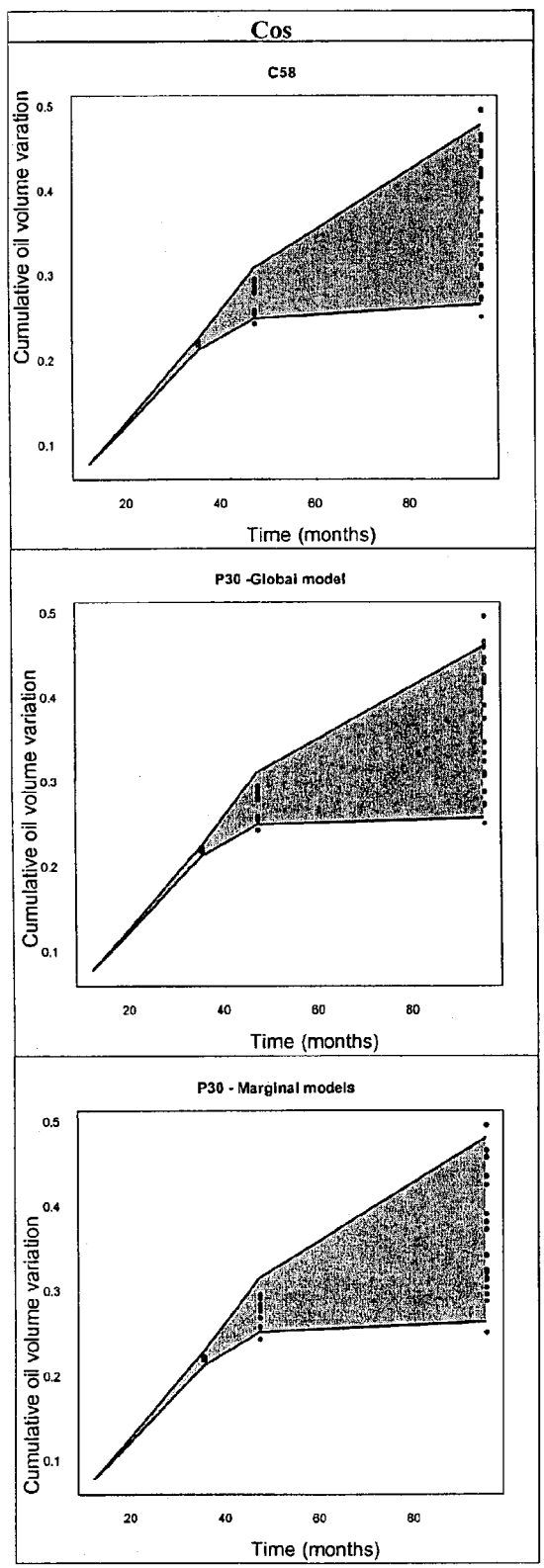
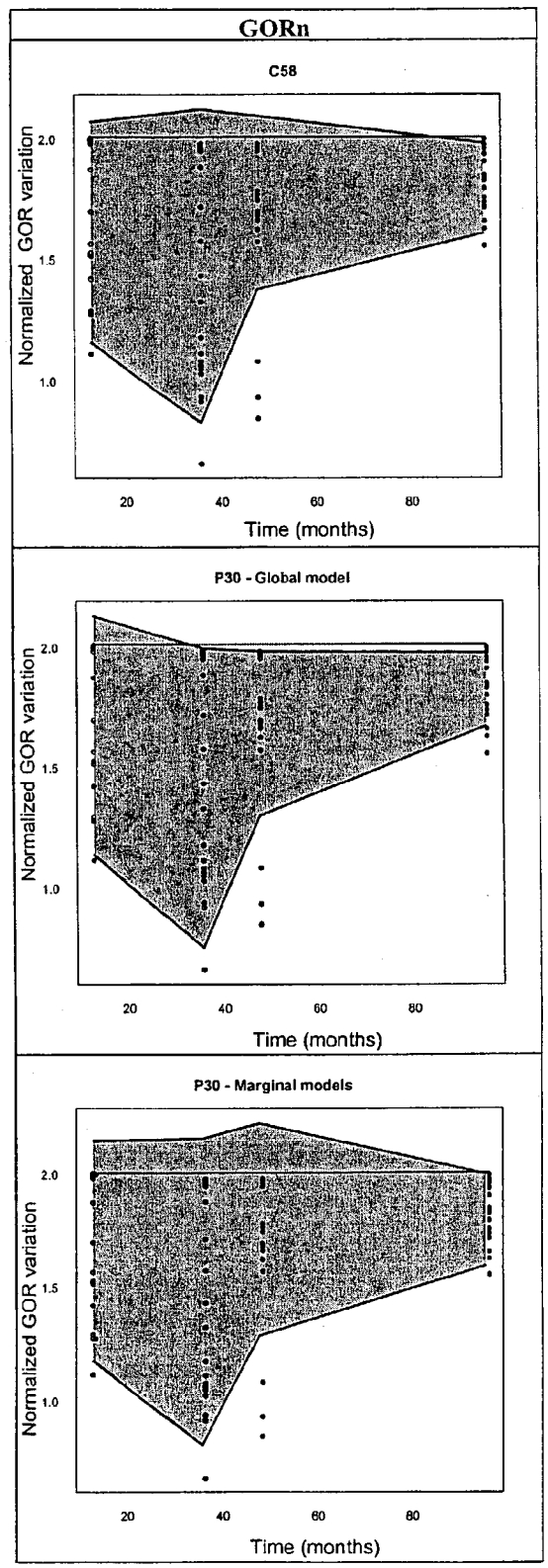

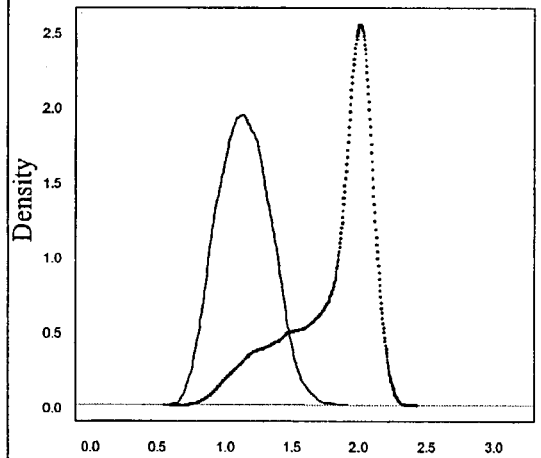
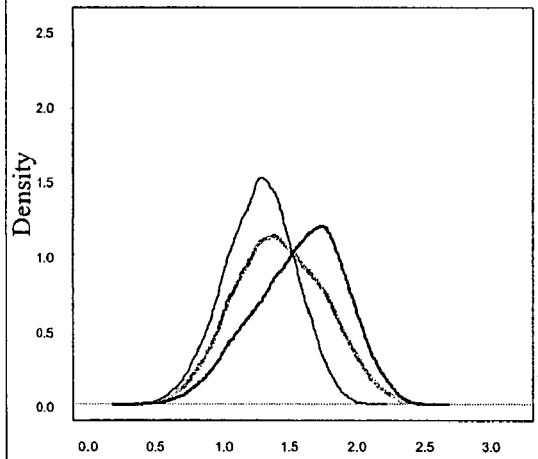
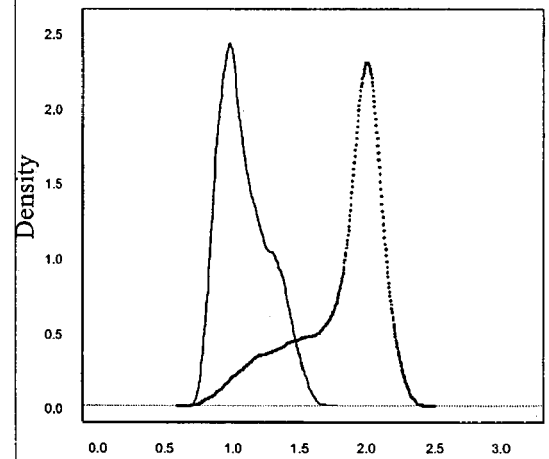
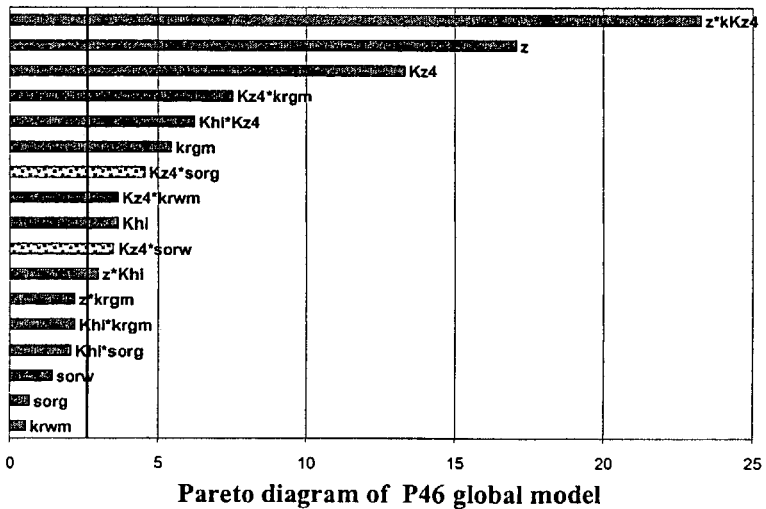

FIG.10

| | Quantitative factors | | | | Qualitative factors | | |
|---|---|---|---|---|---|---|---|
| | $X_1$ | $X_2$ | ... | $X_d$ | $Z_1$ | ... | $Z_m$ |
| Factorial part | ±1 according to regular fraction $2^{d-r}$ | | | | $Z_1^f$ | | $Z_m^f$ |
| Central part | 0<br>...<br>0 | 0<br><br>0 | ...<br><br>... | 0<br><br>0 | Complete design All of the positive scenarios | | |
| Axial part | $\alpha$<br>$-\alpha$<br>0<br>0<br>...<br>0<br>0 | 0<br>0<br>$\alpha$<br>$-\alpha$<br>...<br>0<br>0 | ...<br>...<br>...<br>...<br>...<br>...<br>... | 0<br>0<br>0<br>0<br>...<br>$\alpha$<br>$-\alpha$ | $Z_1^a$ | | $Z_m^a$ |

METHOD FOR QUANTIFYING UNCERTAINTIES RELATED TO CONTINUOUS AND DISCRETE PARAMETERS DESCRIPTIVE OF A MEDIUM BY CONSTRUCTION OF EXPERIMENT DESIGNS AND STATISTICAL ANALYSIS

BACKGROUND OF THE INVENTION

1. Field of the Invention

The present invention relates to a method for quantifying uncertainties related to continuous and discrete parameters descriptive of a medium such as an underground zone and/or for managing the selection of a scenario from a series of possible scenarios relative to this medium, by construction of experiment designs and results analysis suited to the experiment designs constructed.

2. Description of the Prior Art

The documents mentioned hereafter are representative of the prior art:

Benoist D., Tourbier Y. and Germain-Tourbier S. (1994). Plans d'Expériences Construction et Analyse. Technique & Documentation-Lavoisier, Paris;

Cox D. R. (1984). Present Position and Potential Developments: Some Personal Views: Design of Experiments and Regression. J. of Royal Statistical Society, Ser. A, 147, pp. 306-315;

Dejean J.-P., Blanc G. (1999). Managing Uncertainties on Production Predictions Using Integrated Statistical Methods. SPE 56696, SPE Annual Technical Conference and Exhibition, Houston, 3-6 Oct. 1999;

Draper N. R. and John J. A. (1988). Response-Surface Designs for Quantitative and Qualitative Variables. Technometrics, 30(4), pp. 423-428;

Droesbeke J.-J., Fine J. and Saporta G. (1997). Plans d'Expériences: Applications à l'Entreprise. Technip, Paris Montgomery D. C. and Peck E. A. (1992). Introduction to Linear Regression Analysis. Wiley Series in Probability and Mathematical Statistics, New York;

Wu C. F. J. and Ding Y. (1998). Construction of Response Surface Designs for Qualitative and Quantitative Factors. J. of Planning and Inferences, 71, pp. 331-348;

Zabalza I., Dejean J.-P., Collombier D. (1998). Prediction and Density Estimation of a Horizontal Well Productivity Index Using Generalizes Linear Model. ECMOR VI, Peebles, 8-11 Sep. 1998;

Zabalza-Mezghani I. (2000). Analyse statistique et planification d'expérience en ingenierie de reservoir. Theses de doctorant de $3^{ème}$ cycle, Université de Pau.

The methods for organizing experiment designs generally aim to best plan the experiments or tests to be carried out so as to establish relations between various causes or factors (here the permeability, the porosity, interactions, etc.) and the responses studied (here the cumulative volume of oil, the water cut, etc.) and to derive, if possible, predictive models. In the description hereafter, the analytical (conventionally polynomial) model resulting from the adjustment of experimental results is referred to as "response surface". These methods generally comprise the construction of experiment designs that have to be performed to establish these relations and an analysis of the results.

Various studies have been carried out by Dejean J.-P. et al. (1999), Zabalza I. (1998) and Zabalza-Mezghani I. (2000) in order to quantify the uncertainties on physical parameters of underground hydrocarbon reservoirs such as the porosity, the permeability, the position of the well, the drilled well length, the structure of the heterogeneities by geostatistical modelling, etc., which use the experiment design method and statistical methods.

Although the method resulting from these studies allows dealing with the continuous physical parameters (quantitative factors), it allows taking into account discrete parameters (qualitative factors) such as the status of a fault in the reservoir for example only by repeating the same experiment design as many times as there are scenarios to be compared. The simulation cost then quickly becomes prohibitive. Furthermore, from the studies being carried out separately on each scenario, it is impossible to take into account the effect due to the discrete parameters and thus to quantify the uncertainty related to the scenarios. In the text hereafter, the possible states of a discrete parameter are referred to as "modalities". The scenarios result from the combination of the modalities of discrete parameters. For example, a discrete parameter with two modalities and a discrete parameter with three modalities generate six scenarios. The engineer can choose a scenario if the discrete parameters are controllable (completion levels, etc.) or have no action on the scenarios if a discrete parameter is not controllable (status of a fault, etc.).

The construction of designs integrating both quantitative and qualitative factors has notably been dealt with by Cox (1984). The objectives to be fulfilled by these designs are defined by Draper N. R. et al. (1988). The experiment design construction method defined by Wu C. F. J. et al. (1998) proposes for example fixing for the simulation the quantitative factor levels by means of a composite design (well-known in the art and described in any manual on experiment designs) to which columns representing the qualitative factors are added. These columns are determined from quantitative criteria (optimization of conventional experiment design criteria, D-optimality). In practice, the authors have constructed designs allowing integration of a single discrete parameter with two modalities. Their construction method, based on the numerical optimization of a quality criterion, rapidly reaches its limits when the number of scenarios increases. In fact, the algorithmic cost of determination of such a design cannot be considered in practice.

In the prior art, the results obtained by applying experiment designs are analyzed according to a conventional scheme notably described by Benoist D. et al. (1994) or by Droesbeke J.-J. et al. (1997). This method is perfectly suited to the quantitative factors but it does not allow fully dealing with experiment designs involving quantitative and qualitative factors. There is in fact a loss of information which should be exploited, notably within the context of uncertainties quantification in reservoir engineering.

Conventional analysis of experiment design results cannot be applied in this context, for two main reasons. First, the designs proposed allow adjustment of not only one but several distinct models (global model including the various scenarios and marginal models for each scenario). The model(s) that will provide the most information during the result analysis stages therefore have to be determined. On the other hand, it is necessary to fully understand the role of the discrete parameters in the global model (simple effect and interactions of the qualitative factors, repercussion on the response).

In the context defined above, the main quality required for economical experiment designs integrating both quantitative and qualitative factors is to have the necessary properties for good adjustment of the response surface to the quantitative factors. The structure of the conventional composite design is suited to this type of problem. However, it cannot be applied as it is when there are qualitative factors. In fact, it requires fixing five levels (arranged on a ratio scale) for each factor, which is not possible with the modalities of the qualitative factors (for example two modalities for the status of a fault, open or closed).

SUMMARY OF THE INVENTION

The method according to the invention allows quantification of uncertainties related to continuous and discrete parameters descriptive of an underground zone and/or to manage the selection of a scenario from a series of scenarios, by construction of experiment designs comprising a factorial part, a central part and an axial part, which take into account quantitative and qualitative factors, and a results analysis suited to the experiment designs constructed, characterized in that:

the factorial part of the experiment designs is constructed by folding a factorial design fraction for the quantitative factors into sets and assigning of at least one modality of a qualitative factor to each block formed by folding a set of quantitative factors, and the results are analyzed by combining a sensitivity analysis and a risk analysis involving marginal models and a global model.

A D-optimality criterion is for example used to determine the axial part of the qualitative factors.

The method essentially comprises constructing the factorial part of the experiment designs by folding a regular fraction for the quantitative factors and assignment of at least one modality of a qualitative factor to each one of the blocks formed by folding, determining the axial part of the qualitative factors according to a D-optimality criterion (preferably on a limited number of scenarios) and analyzing the results by combining a sensitivity analysis and a risk analysis involving marginal models (models adjusted to each scenario) and a global model (model adjusted to all of the scenarios). The method allows for example, in an otherwise uncertain context, to compare different production scenarios (reservoir crossed by open or closed faults, enhanced recovery by water injection or WAG type alternating injection, etc.) in order to better understand the role of non-controllable discrete parameters (status of a fault, etc.) and/or to select the scenario which optimizes production in the case of controllable discrete parameters (well addition, completion levels, water injection or WAG, etc.).

The method according to the invention is advantageous in that it saves repeating as many experiment designs as there are scenarios to be compared and it therefore allows notable reduction of the number of simulations to be carried out. Since the studies are carried out jointly on all the scenarios, the method really takes into account of the effect due to the discrete parameters.

More explicitly, the technique of folding a regular fraction for the quantitative factors is advantageous because it allows elimination of certain aliases of the original regular fraction and allows introduction of additional interactions between quantitative factors in the global model. Assignment thereafter of a modality of a qualitative factor to each block formed by folding allows on the one hand to manage the aliases between the qualitative factors and the quantitative factors, and on the other hand to know the aliases (of the original fraction) on each modality of the qualitative factors.

This technique has for example allowed construction so far several tens of experimental designs integrating 2 to 8 continuous parameters while taking into account either a discrete parameter with two modalities (2 scenarios), or a discrete parameter with three modalities (3 scenarios), or two discrete parameters with two modalities (4 scenarios), or a discrete parameter with two modalities and a discrete parameter with three modalities (6 scenarios).

The construction method according to the invention can be extended to designs taking into account a larger number of quantitative and qualitative factors with more than three modalities. In relation to the prior methods, it allows better management of the aliases on the factorial part by means of the folding technique and integration of several qualitative factors with two or three modalities while reducing the numerical optimization cost of the D-optimality since, unlike Wu and Ding's technique (1998), it is carried out only on the axial part of the qualitative factors and for a limited number of scenarios.

According to an embodiment of the method, a sensitivity analysis is carried out by means of marginal models to detect the terms or actions (simple effects and interactions of the factors) which influence each scenario and a sensitivity analysis is carried out by means of the global model to detect the terms that globally influence all of the scenarios. This use of marginal models allows obtaining of substantially the same results in terms of detected actions as the prior methods using a composite design on each scenario. Furthermore, using the global model provides additional information (effects of the discrete parameters and a richer model on the continuous parameters), and at a lower cost (observed reduction of the order of 20% in relation to the prior methods).

According to an embodiment of the method, the risk is analyzed by localized prediction of a response in the form of a prediction interval for a set of fixed values of the parameters, by means of the global model, which leads to a lower cost in relation to the methods wherein a composite design is constructed for each scenario.

According to an embodiment of the method, the risk is analyzed by predicting responses from a large number of sets of values of the parameters, randomly selected in their variation range.

Preferably, the global model is used when the or each discrete parameter is not controllable (status of a fault for example, which can be open or closed).

When the or each discrete parameter is controllable, the global model is preferably used if it detects a very influential quantitative-quantitative interaction (in terms of a specific result in the application selected) which cannot be detected by the marginal models; in the opposite case, the marginal models are used.

A consequence of this embodiment of the method is that it reduces down the sensitivity analysis while removing the doubts about the respective influence of the quantitative-quantitative interactions and the aliased quantitative-qualitative interactions.

The method finds applications notably for reservoir exploration or engineering for example, which are applied in the description hereafter.

The availability of increasingly realistic numerical models of complex flows facilitates simulation and therefore opens up the way for controlled management of the field development and production schemes. However, although many data are obtained on the reservoir by different means (geology, geophysics, local measurements in wells, well testing, etc.), there still are many uncertain simulator input parameters and a large number of exploitation possibilities. The example of a reservoir consisting of six layers for which a high uncertainty remains on the imperviousness of layer 4 is considered. To produce this reservoir, on a producing well is proposed at the top of the reservoir, but hesitation exists to drill just below layer 4 in order to drain the lower part of the reservoir at the risk of favoring an early water influx. A statistical formalism and the carrying out of experiments (simulations for different values of uncertain parameters, for example between 0.01 mD and 10 mD for the vertical permeability of layer 4, and for various production scenarios, for example drilling or not below layer 4) according to an experiment design allows comparing production scenarios and improving knowledge of the reservoir while avoiding excessive and redundant use of simulations of the numerical flow model.

The goal is thus to provide reservoir engineers with a methodology allowing comparison of various production scenarios (reservoir crossed by open or closed faults, enhanced recovery by water injection or WAG type alternating injection, etc.), notably upon quantification of the uncertainties in reservoir engineering, and more generally upon quantification of the uncertainties in exploration-production of oil reservoirs. Comparing scenarios, in an otherwise uncertain context, is a necessary activity:

on the one hand to better understand the role of the non-controllable uncertain discrete parameters (status of a fault, etc.), and on the other hand to select the scenario that optimizes production in the case of controllable discrete parameters (well addition, completion levels, water injection or WAG, etc.).

Such a methodology allows prediction of the future dynamic behavior of the field and allows well-considered adjustment of the decisions made as regards development.

The method constructs the factorial part of the experiment designs by folding a regular fraction for the quantitative factors and assignment of at least one modality of a qualitative factor to each one of the blocks formed by folding, determining the axial part of the qualitative factors according to a D-optimality criterion (preferably on a limited number of scenarios) and analyzing the results by combining a sensitivity analysis and a risk analysis involving marginal models (models adjusted to each scenario) and a global model (model adjusted to all of the scenarios). The method allows, for example, in an otherwise uncertain context, to compare different production scenarios (a reservoir crossed by open or closed faults, enhanced recovery by water injection or WAG type alternating injection, etc.) in order to better understand the role of non-controllable discrete parameters (status of a fault, etc.) and/or to select the scenario which optimizes production in the case of controllable discrete parameters (well addition, completion levels, water injection or WAG, etc.). The method has application, for example, in reservoir exploration or engineering.

BRIEF DESCRIPTION OF THE DRAWINGS

Other features and advantages of the method according to the invention will be clear from reading the description hereafter of embodiments given by way of non limitative example, with reference to the accompanying drawings wherein:

FIGS. 9A to 9D show the result of a Monte Carlo type 3-year prediction of the GORn according to various scenarios (density vs. GOR), and FIG. 10 shows a conventional structure of a composite design modified to take account of qualitative factors.

DETAILED DESCRIPTION OF THE PREFERRED EMBODIMENTS

Figures 1, 2:
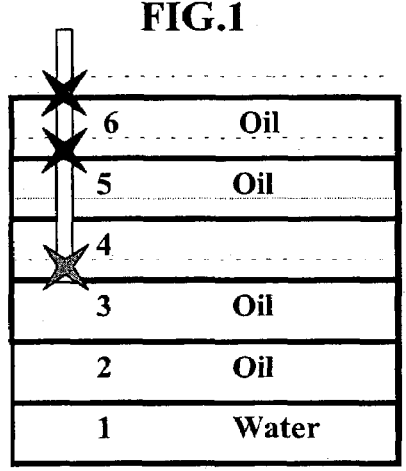
FIG. 1 illustrates a case of validation of a scenario concerning a reservoir model.
FIG. 2 is a chart of the aliases of the experiment designs tested in the validation case where the shaded boxes show that the terms of the model cannot be estimated and the white boxes show that the terms of the model are estimated independently of the other terms (no alias)

The factors dealing with by experiment designs are usually quantitative, that is they have an entirely defined measurement scale (porosity (%), permeability (mD), etc.). However, occasionally it may be desired to introduce qualitative factors in the modelling so as to study the influence of various scenarios on the simulator response (status of a fault, well addition in a new zone to be drained, etc.). These factors have the specific feature of taking a fixed number of states called modalities (open or closed fault, addition of 2, 5 or 7 wells) that cannot be quantitatively compared with one another. They have no measurement scale. It is therefore necessary to code these states using variables indicative of the "presence-absence" of the modalities of the qualitative factors. They are numerical and can thus be introduced in the model.

Concerning the introduction of discrete parameters in the model and the necessity of coding these discrete parameters, refer is made to the books by Montgomery and Pecks (1992) or Benoist et al. (1994).

I) Construction of the Designs

The goal of this first part is to construct economical experiment designs integrating both quantitative and qualitative factors. In the present context, the main quality required for these designs is to have the necessary properties allowing good response surface adjustment to the quantitative factors. Faced with such a problem, the user can consider two approaches. The first one consists in not taking into account the two types of parameters and in applying a composite design to all the factors. This solution requires 5 (or 3) levels (arranged on a ratio scale) for each factor, which is not always possible for qualitative factors. The second approach consists in using a composite design on each scenario defined by the modalities of the qualitative factors. It is in fact this second solution which has been priorly used (that is repetition of designs) because it allows obtaining a quality response surface as a result of the properties of the composite designs. It can however become very costly.

The problem of taking account of the qualitative factors in designs for a response surface was raised by Cox (1984). The first to take a real interest in the question were Draper and John (1988). They notably discuss the relations between design and model in order to define desirable and reasonable goals as regards the designs. The construction method of the invention is intended to reach these goals described hereunder.

Goals and Global Model

The quantitative factors of the Global Model are denoted by $x_1, \ldots, x_d$ and the qualitative factors by $z_1, \ldots, z_m$.

(H1) The design has to efficiently adjust a second order global model of the type

| mean eff. | quantitative simple eff. | qualitative simple eff. | quant.-quant. interactions | quant.-qual. interactions | quadratic eff. |
|---|---|---|---|---|---|
| (1, | $x_i$, | $z_p$, | $x_i x_j$, | $x_i z_p$, | $x_i^2$) |

$i=1, \ldots, d$ and $p=1, \ldots, m$. The maximum determinant criterion is used to compare the designs, $$\Delta + \sqrt[s]{det(^tXX)},$$

where s is the number of actions in the model.

(H2) The design is divided in two parts. The first one must allow adjustment of an order one global model of the type $(1, x_i, z_p, x_i x_j, x_i z_p)$ allowing a sensitivity study. It is therefore necessary to know the alias table of this first part of the design. The second one can be seen as an additional part so as to extend the model to order two.

(H3) For each combination of the qualitative factors or for each level of a qualitative factor $z_k$, the design must allow efficient adjustment of an order two marginal model of the type;

$(1, x_i, x_i x_j, x_i^2)$

Description of the design and of its construction

The construction method accounts for the conventional composite design structure which seems well-suited to goals (H1) and (H2). It is however modified in order to integrate the particularities due to the qualitative factors. The design thus consists of the three parts (factorial, central and axial) of the conventional composite design on the quantitative factors, with which are juxtaposed the qualitative factor columns that are naturally also divided in three parts, as shown in FIG. 10.

Notations $z_k^f$ and $z_k^a$ designate the components of the qualitative factor $z_k$ associated with the factorial and axial parts.

The factorial part on the quantitative factors has 2 levels −1 and 1, and corresponds to a fraction of the complete design of size $N_f = 2^{d-r}$. It has been decided here to use regular fractions to construct the factorial part because they have the property of being defined by r alias and thus facilitate the sensitivity analysis. The factorial part is constructed with the known folding principle which consists in doubling a regular fraction either by repeating the columns or by converting them to their opposites. Thus, after folding, a column C of the initial fraction becomes $$\begin{vmatrix} C \\ C \end{vmatrix} \text{ or } \begin{vmatrix} C \\ -C \end{vmatrix}.$$

This technique allows simplification of the alias structure of the factorial part, or even to go from a fraction of solution R to a solution R+1. The regular fraction is folded as many times as there are scenarios, and a scenario defined by the qualitative factors is associated to each block thus formed. This technique allows, on the one hand, elimination of aliases on the quantitative-quantitative interactions of the original regular fraction (richer order one global model (H2)), and on the other hand knowing the aliases on each scenario (those of the original fraction) (H3).

The central part consists of a point at the center of the variation range of the quantitative factors for each scenario defined by the qualitative factors. Its size is thus $N_c = lev_1 \times \ldots \times lev_m$, where $lev_k$ represents the number of modalities of the kth qualitative factor. It allows estimation of the variability of the response on the quantitative factors and to test the appropriateness of the order one model.

The axial part of the qualitative factors of the global model may be determined by a D-optimality criterion described as follows:

The axial part has 3 levels $-\alpha$, 0 and $\alpha$ on the quantitative factors. It is of constant size $N_a = 2d$, whatever the number of qualitative factors. It allows estimation of the quadratic effects of the quantitative factors. Once the factorial part is fixed, the axial part on the qualitative factors, $z_k^a$, is selected in such a way that the design meets hypothesis (H1), that is the maximization of the determinant criterion for the model of hypothesis (H1). In general, optimization of this criterion is not performed numerically, unlike Wu and Ding (1998), but it is deduced from the particular form of matrix $^tXX$, while favouring a limited number of scenarios.

The total size of the design is $N = N_f + N_c + N_a = 2^{d-r} + lev_1 \times \ldots \times lev_m + 2d$.

The prior method as used by Wu and Ding (1998) mentioned above uses an optimization the whole of the components of the qualitative factors, which rapidly leads to a high algorithmic cost when the number of scenarios increases. The construction method defined here involves on the contrary an optimization criterion (determinant) only on the axial part of the qualitative factors and on a limited number of scenarios. The optimization range considered in the present method being more reduced, it is possible in return to construct, at an acceptable cost, for example designs for 2 to 8 quantitative factors and for a discrete parameter with two modalities (2 scenarios), a discrete parameter with three modalities (3 scenarios), two discrete parameters with two modalities (4 scenarios) or a discrete parameter with two modalities and a discrete parameter with three modalities (6 scenarios). This construction technique can be extended to designs that take into account a larger number of quantitative and qualitative factors with more than three modalities.

II) Analysis of the Results

The conventional analysis of experiment design results cannot be applied in this context for two main reasons. First, the designs allow adjustment of not only one but of several distinct models (global model to the various scenarios and models for each scenario). The model(s) that will provide the most information therefore has to be determined to analyse the results. Besides, it is necessary to fully understand the role fulfilled by the discrete parameters in the global model (simple effect and interactions of the qualitative factors, repercussion on the response). A methodology is provided which answers these questions. It is established according to two main lines: sensitivity analysis and risk analysis.

Sensitivity Analysis

The goal of sensitivity analysis is to detect the terms of the model (simple effects, quantitative-quantitative interactions, quantitative-qualitative interactions) that influence the response. For this first part, the factorial part of the design is used to adjust models without quadratic terms.

Model Selection

A complete sensitivity analysis requires simultaneous use of the global and marginal models.

The marginal models allow detection of the terms or actions that influence each scenario. These models are often quite poor but they allow at a minimum an analysis of the simple effects of the quantitative factors (FIG. 2).

Figure 3A:
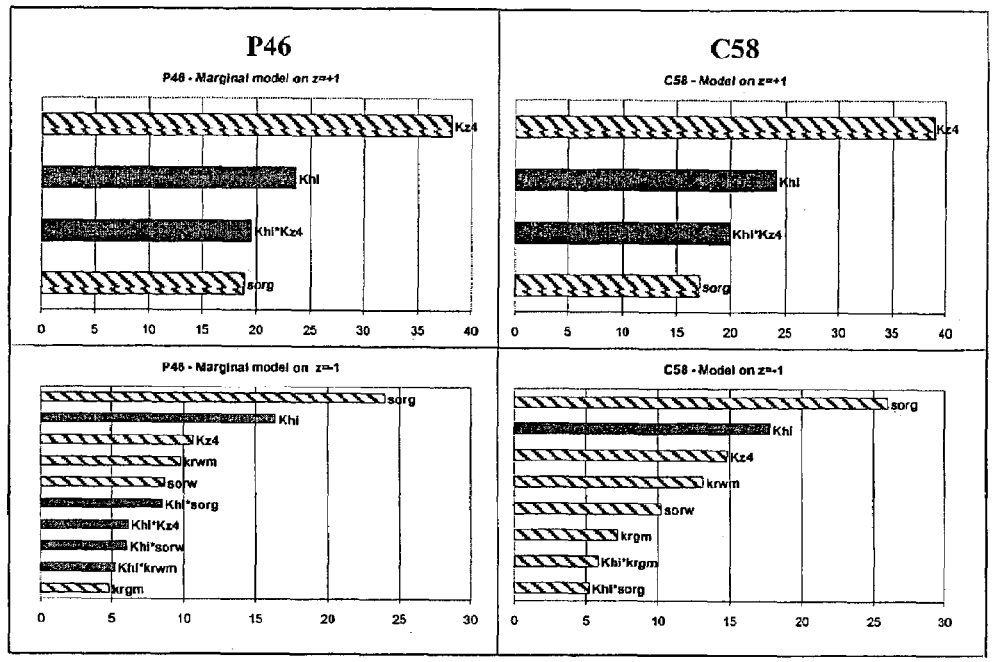
FIGS. 3A, 3B show, in a Pareto diagram, the results of a sensitivity analysis of a cumulative volume of oil showing the marginal respective roles of the marginal models (FIG. 3A) and of the global model (FIG. 3B), and a comparison with the results obtained by means of a prior method.
Figure 3B:
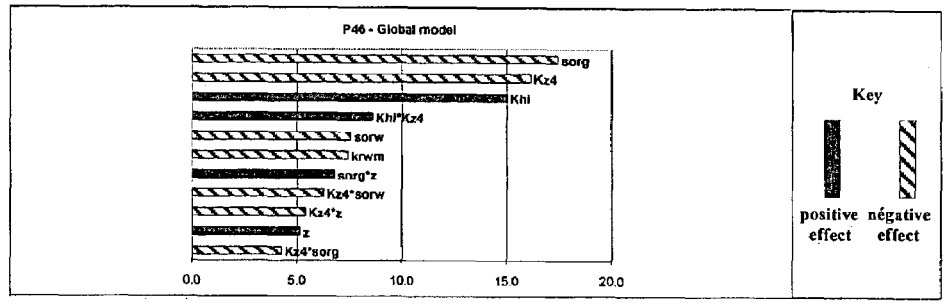
Figure 6:
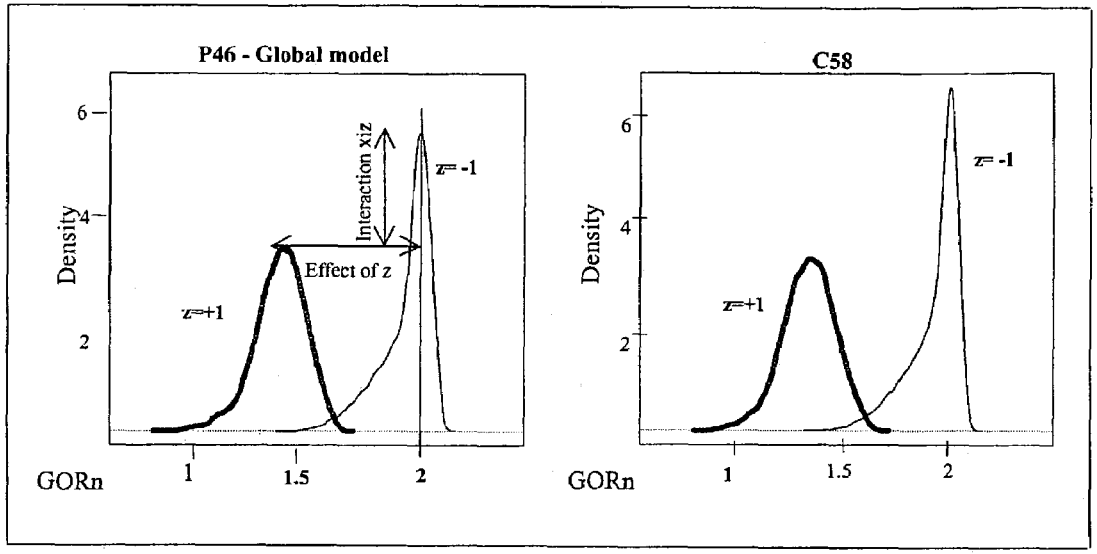
FIG. 6 shows the results of a risk analysis (Monte Carlo type prediction) obtained on two different scenarios, with analysis of the global model, and the influence of the simple effects and of the quantitative-qualitative interactions on the density.

The global model detects the influential terms, all scenarios being taken into account. It may be noted that an action can be considered to be negligible by the global model whereas it is very influential but on only one scenario (FIG. 3). In fact, the global model proceeds in a way by averaging the influence on all the scenarios, hence the importance of the marginal models. The global model has two main qualities:

It allows detection if a discrete parameter is influential via its simple effect. In other words, if there is a discrepancy in the average response from one scenario to the other (FIG. 6). Furthermore, if permitted by the design, it allows detection of influential quantitative-qualitative interactions, that is to take account of the difference in the behavior of the simple effects of the quantitative factors between the scenarios (FIG. 6).

The factorial part of the design has been constructed to enrich the global model in relation to the marginal models. It therefore allows detection of many more globally influential actions (FIG. 3).

Comparison with the prior method (repetition of a composite design on each scenario) (FIG. 3)

1) The marginal models give results that are in accordance with those of the prior method (same terms detected).

2) The global model provides additional information (effects of the discrete parameters and richer model on the continuous parameters).

3) Cost reduction observed: 20% in relation to the prior method.

Risk Analysis

Localized Prediction

Localized prediction consists in predicting the response in form of a prediction interval for a fixed set of parameters. The goal in the end can be to determine a set of parameters that will optimize the response surface. Prediction is performed from a model integrating the quadratic effects adjusted by means of the design including the factorial, central and axial parts.

Model Selection

For this type of study, it is recommended to use the global model because it gives more stable results from one scenario to the other. Predictions using marginal models can be more unstable in some cases (FIG. 4) because only a small number of terms can be introduced in these models.

Comparison with the Prior Method

Figure 4:
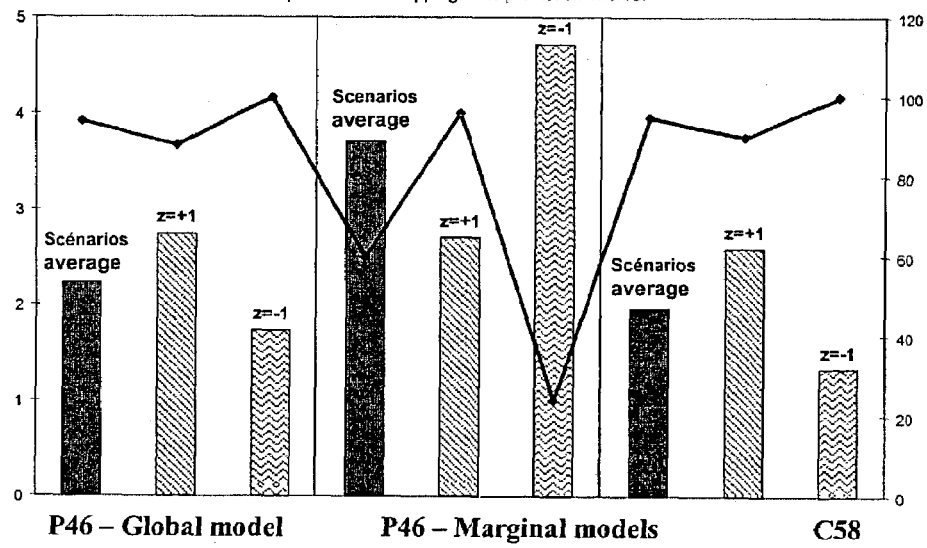
FIG. 4 shows the results of a risk analysis (localized prediction of a GOR) and a comparison of the results obtained from the global model, the marginal models and the prior method, FIGS. 5A and 5B respectively show the results of a risk analysis (Monte Carlo type prediction) on a cumulative volume of produced oil (FIG. 5A) and on a GORn (FIG. 5B), with quantification of the uncertainty on the discrete and continuous parameters, and comparison of the results obtained from the global model, the marginal models and the prior method.

1) The global model gives results whose quality is equivalent to the results of the prior method (FIG. 4).

2) For a globally equivalent model quality, the designs that integrate the qualitative factors allow reduction of the number of simulations of the prior method (the example of FIG. 4 shows a 20% reduction from 2 composite designs of size 29, i.e. 58 simulations, to a design with qualitative factors with 46 simulations).

Monte Carlo Prediction

The Monte Carlo prediction predicts responses from a large number of sets of parameters randomly selected in their variation range. The density and the quantiles of the responses obtained are then calculated in order to quantify the uncertainty on the continuous and discrete parameters.

Role of the Discrete-Parameter Terms in the Global Model

The density obtained from the Monte Carlo predictions can vary from one scenario to the other. The point is then to know which terms of the global model allow retranscription of this variation. Paragraph 1 of the first part describes the role of the simple effects of the qualitative factors and of the quantitative-qualitative interactions in the model. This role affects the density as follows:

The simple effect of the discrete parameter(s) of the global model induces a difference in the average response between the scenarios (FIG. 6);

The quantitative-qualitative interactions of the global model induce the uncertainty difference (forms of the marginal densities) (FIG. 6).

Modification of the Global Model

Figure 7:
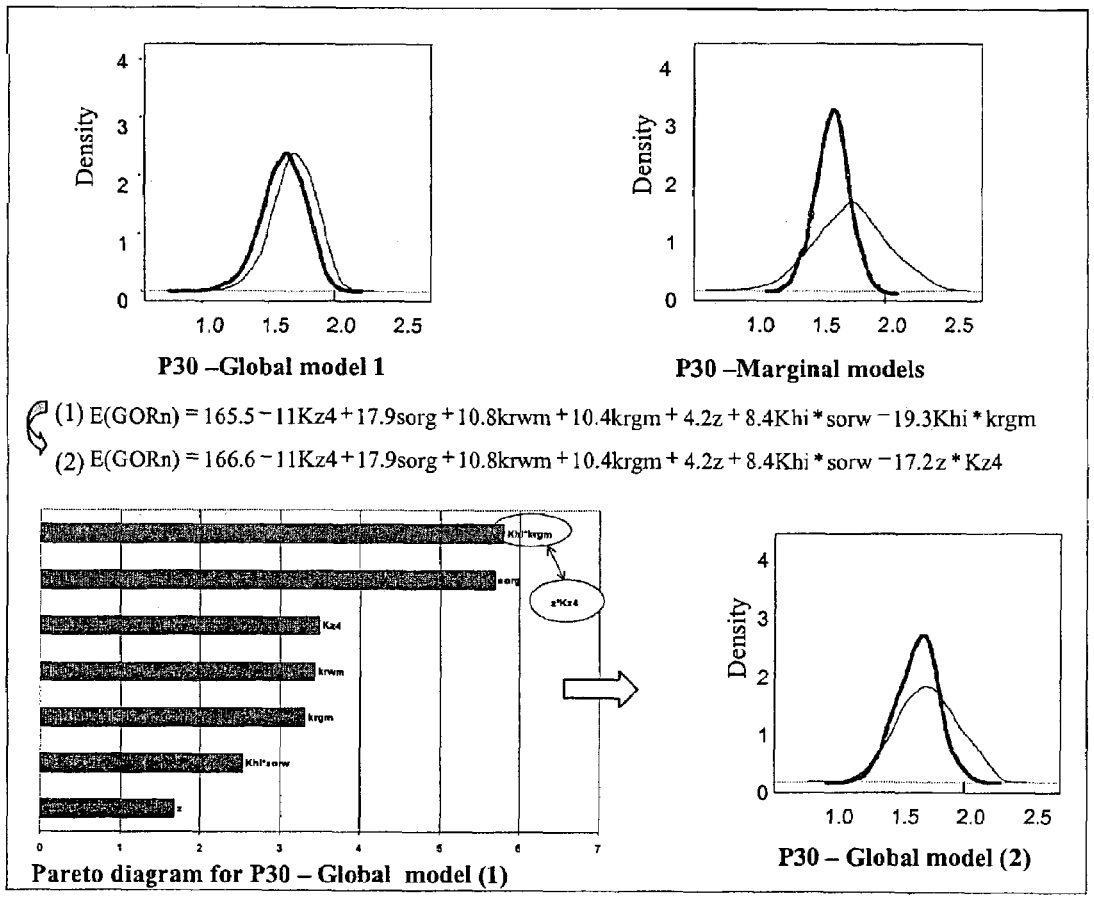
FIG. 7 shows the results of a risk analysis (Monte Carlo type prediction) with an illustration of the methodology concerning the modification of the global model.

However, all the designs do not allow introduction of the quantitative-qualitative interactions in the model. These interactions are then aliased with quantitative-quantitative interactions (for example design P30 of the validation case). It is therefore important to ensure that the really influential interactions appear in the model among the aliases. For example, the quantitative-qualitative interaction replaces the quantitative-quantitative interaction with which it is aliased if knowledge of the physical phenomenon suggests that the quantitative-quantitative interaction is negligible. In cases where knowledge of the physical phenomenon does not allow taking a decision, the following procedure will be carried out (FIG. 7):

For each scenario, the densities constructed from the global model and the marginal models are drawn, if an uncertainty difference is observed (amplitude and form of the densities) between the global model and the marginal models, it is deduced therefrom that there is a lack of quantitative-qualitative interactions in the global model, an iterative procedure is then carried out by replacing the quantitative-quantitative interactions of the global model by the quantitative-qualitative interactions with which they are aliased until the behavior of the uncertainty obtained by the global model is stabilized.

This technique also allows refining the sensitivity analysis by removing the doubt about the respective influence of the aliased quantitative-quantitative and quantitative-qualitative interactions. In fact, if replacing in the global model an influential quantitative-quantitative interaction by the aliased quantitative-qualitative interaction significantly modifies the density, it can be deduced that it is the quantitative-qualitative interaction which influences the response and not the quantitative-quantitative interaction.

Model Selection

The model is selected after modifying the global model if necessary.

In cases where the discrete parameter is not controllable (status of a fault, etc.), the global model allows correct qualification of the uncertainty on the continuous and discrete parameters. In some cases, the marginal models tend to overestimate the uncertainty interval defined by the quantiles (FIG. 5), considering the small number of terms that can be introduced in the model.

In cases where the discrete parameter is controllable (well addition, etc.), two situations can arise. Either the global model allows detecting of a very influential quantitative-quantitative interaction that cannot be estimated with the marginal models and the global model is used (FIG. 8), or the additional quantitative-quantitative interactions of the global model are detected as negligible and the marginal models are used (FIG. 9). In both situations, quantification of the uncertainty on the continuous parameters for each scenario allows selection of the scenario that optimizes production.

Comparison with the Prior Method

1) The designs of the present invention give results whose quality is equivalent to those of the prior method (FIGS. 5, 6, 8 and 9), but at a lower cost.

2) The global model allows quantification of the uncertainty on the scenarios and the continuous parameters, which is impossible when carrying out separate studies.

3) The marginal models allow removing the doubt on the respective influence of the aliased quantitative-quantitative and quantitative-qualitative interactions.

III) Validation Case and Figures

Description of the Validation Case

A validation case is presented hereinafter for a design with 6 continuous parameters and a 2-modality discrete parameter.

For this validation part, a synthetic reservoir model has been constructed. It consists of 6 layers, as illustrated in FIG. 1. The lower layer is permeable and water-saturated. Layers 2, 3, 5 and 6 have good reservoir properties whereas layer 4 has less favorable petrophysical properties. Layers 2 to 6 are impregnated with oil. Besides, there is a high uncertainty on the imperviousness of layer 4 due to clay banks, which might prevent any vertical transmissivity between layers 1-2-3 and 5-6.

It is assumed that major quantitative type uncertainties remain on the field, notably on the absolute and relative permeability values. For this study, the following 6 uncertain continuous parameters were selected:

$x_1$ represents the horizontal permeability of layers 1, 2, 3, 5 and 6, denoted by Khi Uncertainty range: 700 mD-1300 mD $x_2$ represents the vertical permeability of layer 4, denoted by Kz4

Uncertainty range: 0.01 mD-10 mD $x_3$ represents the residual oil saturation after sweeping with water, denoted by Sorw Uncertainty range: 0.1-0.3

$x_4$ represents the residual oil saturation after sweeping with gas, denoted by Sorg Uncertainty range: 0.1-0.3

$x_6$ represents the maximum point of relative gas permeability, denoted by Krgm Uncertainty range: 0.1-0.3.

$x_6$ represents the maximum point of relative water permeability, denoted by Krgm Uncertainty range: 0.1-0.3.

To produce this reservoir, a producing well is proposed to be placed at the top of the reservoir and an injection well at the aquifer level. The producing well drilling levels remain uncertain. Hesitation exists to drill just below layer 4 so as to drain the lower part of the reservoir in case of imperviousness of layer 4, at the risk of favoring an early water influx that would penalize the total productivity of the well. It has therefore been decided to introduce a 2-modality qualitative factor for this completion:

z represents the completion at layers 5 and 6 (z=+1) or at layers 3, 5 and 6 (z=−1).

The simulator responses studied at different times after production start are:

the cumulative volume of oil (COS), $$\text{the normalized } GOR\left(0 \le GORn = \frac{2Q_G}{(Q_G + RS \times Q_O)} < 2\right),$$

the water cut (FW).

The technical goals of this study are to:

identify the influential parameters (continuous and discrete) or the influential interactions via a sensitivity analysis, quantify, via a risk analysis, the uncertainty induced by the influential parameters on the production estimates, and recommend a choice for the completion type according to the probability densities obtained.

The Experiment Designs Tested with their Aliases

The chart of FIG. 2 shows the alias structures of the designs tested in the validation case with the models that can be adjusted therewith. Designs P30 and P46 integrate a discrete parameter. They have been constructed according to the method of this invention. Designs C42 and C58 correspond to the prior method, i.e. to the repetition of a composite design of size 21 and 29 on each one of the two scenarios.

A Posteriori Systematic Validation

In order to validate the results and to compare the prior method with the method of the invention, a series of a posteriori simulations has been carried out. A 100 simulations are performed in the entire range of uncertainty of the continuous parameters (50 for each scenario), distinct from the simulations carried out at the points of the experiment designs. The results of these simulations (considered to be the absolute reference) are compared with the predictions provided, on the one hand by means of the designs of the present invention, and on the other hand by means of the repeated composite designs (current state of the art).

Sensitivity Analysis

It can be seen in FIG. 3 that the results obtained with the marginal models of design P46 are of the same nature as those of design C58. The same terms are globally detected on each scenario but with 12 simulations less.

Furthermore, the global model of design P46 allows analyzing additional quantitative-quantitative interactions (Kz4*sorw and Kz4*sorg are detected influential), as well as the effect of the discrete parameter (z) and of the quantitative-qualitative interactions (sorg*z and Kz4*z are detected influential, an effect expected for Kz4*z).

Risk Analysis: Localized Prediction

In FIG. 4, the bars represent the average on the 100 simulations of the relative error in percent:

$$\sum_{i=1}^{100} \frac{(y_i - \hat{y}_i)}{y_i}$$

where $y_i$ is the ith validation simulation and $\hat{y}_i$ its prediction. The grey areas represent the relative error, all the scenarios being taken into account, and the hatched areas represent the relative error per scenario. The curve represents the number (%) of validation simulations that belong to their prediction interval.

The relative error allows appreciation of the quality of the prediction, and the percentage of validation simulations in its interval allows appreciation of the quality of the prediction interval. It can be noted that the global model gives more stable results that the marginal models. In fact, the marginal model for z=−1 seems to be of very bad quality (5% relative error and only 20% of the validation simulations in their prediction interval). Ihe global model of design P46 gives results of the same quality as design C58 with 12 simulations less.

Risk Analysis: Uncertainty Quantification by Monte Carlo Prediction

The cones of FIG. 5 are determined from the quantiles of the density of the Monte Carlo predictions. They represent the uncertainty on the production (Cos and GORn) due to the continuous and discrete parameters. The points are the a posteriori simulations. It can be observed that all of the designs are of very good quality (80% to 100% of the a posteriori simulations are in the uncertainty interval), even for design P30 which requires 28 simulations less than C58.

By definition, the normalized GOR cannot exceed value 2, and the upper boundary of the uncertainty interval is often above 2. There is an interval overestimation whatever the design. The marginal models exaggerate this overestimation, which is why the global model is preferably used.

Role of the Discrete Parameters in the Model and Modification of the Global Model The curves of FIG. 6 represent the densities of the Monte Carlo predictions obtained on each scenario. In the global model, the average response difference between two scenarios is taken into account by an important simple effect of z (26.1% of the total influence of the terms of the model according to the sensitivity analysis). The difference in the behavior of the quantitative factors between the scenarios is taken into account by interactions $x_i z$ (8.4% of the total influence of the terms of the model) which are integrated in the global model for design P46.

The global model of design P30 does not allow estimation of the quantitative-qualitative interactions (see alias table). In its initial form (1), it therefore does not allow accounting for the uncertainty difference that can be observed by means of the marginal models: an amplitude difference can be seen in FIG. 7 in the graph on the right (marginal models), which does not appear in the graph on the left (global model). It is then necessary to return to the Pareto diagram of the sensitivity analysis to find a quantitative-quantitative interaction(s) which logically seems to be negligible and which has however been detected as influential, and to replace it by the quantitative-qualitative interaction to which it is related. For example, for the validation case, it may be assumed that interaction Khi*krgm has physically no reason to be influential, it is therefore replaced by interaction z*Kz4 to which it is related. In fact, it seems obvious that the interaction between the completion level and the permeability of layer 4 will play an important role in the production. After the global model has been modified, an uncertainty behavior identical to the behavior obtained by the marginal models can be found.

This technique can be used in order to refine the sensitivity analysis. When two terms are aliased, only one appears in the model and therefore in the Pareto diagram. It is then impossible to know (quantitatively) which one of the two terms is actually influential. The densities on each scenario obtained with the global model and the marginal models can then be drawn. If an uncertainty difference is observed between the two of them, a quantitative-quantitative interaction is replaced in the global model by the quantitative-qualitative interaction with which it is aliased. If the uncertainty difference decreases, one may conclude that the quantitative-qualitative interaction is more influential in the model than the quantitative-quantitative interaction and conversely.

Choosing Between Global Model or Marginal Models for the Monte Carlo Prediction

The densities obtained by design C58 are considered as references here.

Figure 8:
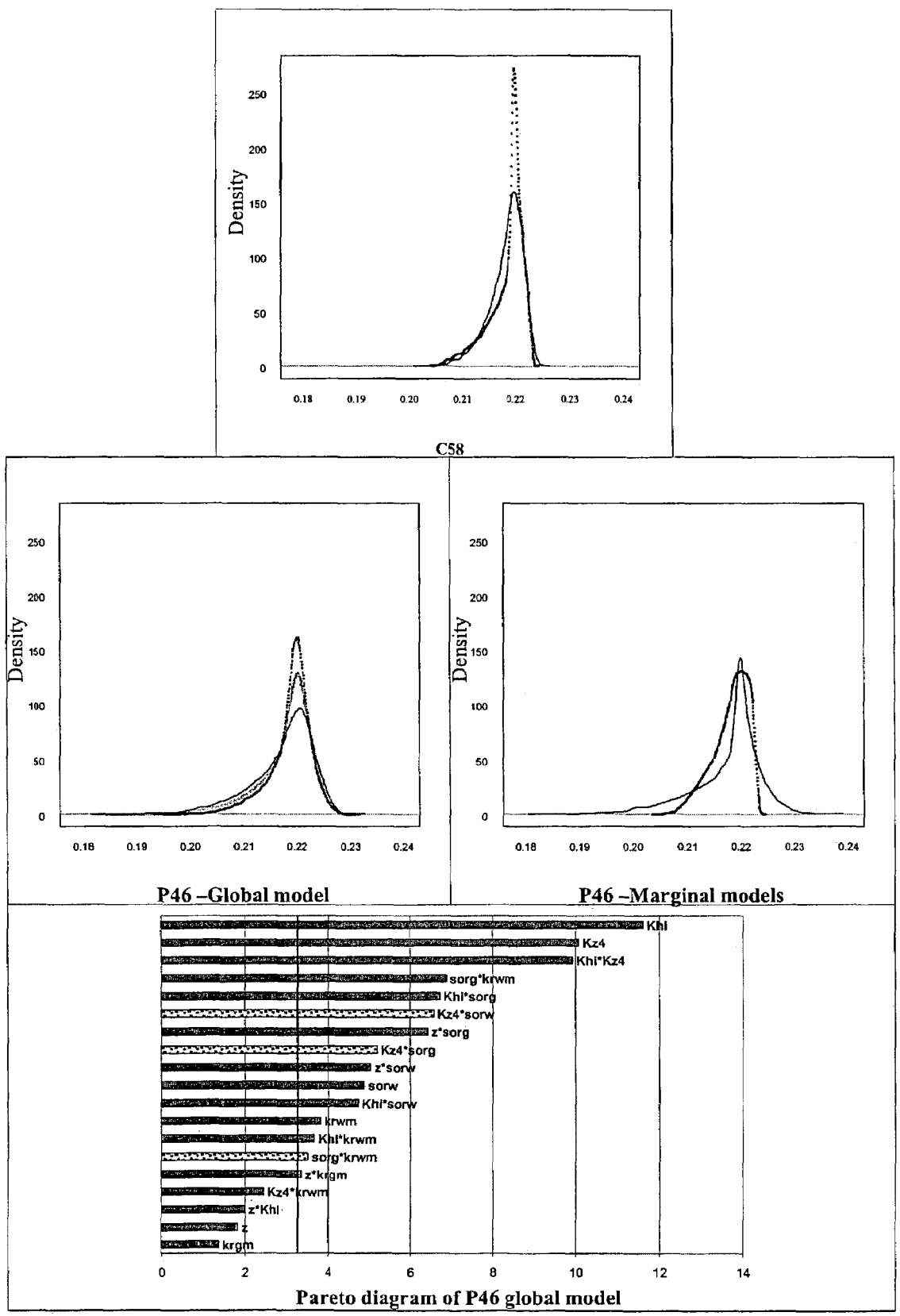
FIG. 8 shows the result of a Monte Carlo type 3-year prediction of the cumulative volume of oil according to various scenarios (density vs. GOR)

In the Pareto diagram of FIG. 8, the global model of design P46 is seen to detect very influential quantitative-quantitative interactions that cannot be estimated by the marginal models (Kz4*sorw, Kz4*sorg and sorg*krwm). Therefore, the densities on each scenario obtained by means of the global model of design P46 are more in accordance with those of design C58 than the densities of the marginal models of P46.

In the Pareto diagram of FIG. 9, it can be seen that the global model of design P46 detects quantitative-quantitative interactions that cannot be estimated by the marginal models (Kz4*sorw, Kz4*sorg), but they are very weakly influential. The densities on each scenario obtained by means of the marginal models of P46 are then more in accordance with those of design C58 than the densities of the global model of P46.

CONCLUSION

Concerning the sensitivity analysis, designs P46 and P30 have allowed detection of substantially the same influential terms as designs C42 and C58 by means of the marginal models. Furthermore, for a lower number of simulations (20% reduction), using the global model of designs P30 and P46 provides additional information by detecting quantitative-quantitative interactions that neither design C42 nor design C58 can estimate, and by analysing the effect due to the completion via the simple effect or the interactions of the qualitative factor.

Concerning the risk analysis by localized prediction, designs P30 and P46, by means of the global model, give results whose quality is equivalent to the prior designs C42 and C58, at a lower cost.

Concerning the Monte Carlo type prediction, designs P30 and P46, by means of the global model or of the marginal models, allow both quantification of the uncertainty as well as designs C42 and C58 with less simulations and removal of the doubt about the respective influence of the aliased quantitative-quantitative and quantitative-qualitative interactions (here Khi×krgm and z×Kz4).

The contribution of the designs of this invention and of the methodology developed is therefore significant and allows improvement of the results of the prior method while reducing the number of simulations.

The method has been described in applications to reservoir exploration or engineering. It is clear that it could also be used in other contexts such as, for example, medicine or agronomy.

The invention claimed is:

1. A method of optimizing production from an underground reservoir comprising the steps:
   (a) collecting at least one continuous and at least one discrete petrophysical parameter descriptive of the reservoir;
   (b) defining a series of production scenarios from the petrophysical parameters;
   (c) combining a sensitivity analysis and a risk analysis to analyze the production scenarios which includes constructing experiment designs comprising a factorial part, a central part and an axial part by taking account of the at least one continuous and the at least one discrete petrophysical parameter, forming at least one block by folding a regular fraction for the at least one continuous parameter and assigning to each block at least one modality of at least one discrete petrophysical parameter; and analyzing results by combining the sensitivity analysis and the risk analysis involving marginal models and a global model;
(d) determining a selection of the production scenarios from the sensitivity and risk analysis;
(e) performing flow simulations for the selection of the production scenarios;
(f) determining a dynamic behavior of the underground reservoir from the flow simulations;
(g) selecting a production scenario from the dynamic behavior that optimizes production; and
(h) adjusting controllable discrete parameters in the underground reservoir as determined from the selected production scenarios to achieve optimized production from the reservoir.

2. The method as claimed in claim 1, comprising determining an axial part of qualitative factors according to a D-optimality criterion.

3. The method as claimed in claim 1, comprising achieving the sensitivity analysis by using the marginal models to detect terms that influence each scenario and by using the global model to detect terms that globally influence all of the scenarios.

4. The method as claimed in claim 2, comprising achieving the sensitivity analysis by using the marginal models to detect terms that influence each scenario and by using the global model to detect terms that globally influence all of the scenarios.

5. The method as claimed in claim 1, comprising analyzing a risk by localized prediction of a response in a form of a prediction interval for a fixed set of values of the parameters, by using the global model.

6. The method as claimed in claim 2, comprising analyzing a risk by localized prediction of a response in a form of a prediction interval for a fixed set of values of the parameters, by using the global model.

7. The method as claimed in claim 3, comprising analyzing a risk by localized prediction of a response in a form of a prediction interval for a fixed set of values of the parameters, by using the global model.

8. The method as claimed in claim 4, comprising analyzing a risk by predicting responses from a number of sets of values of a parameter, randomly selected in a variation range thereof.

9. The method as claimed in claim 1, comprising analyzing a risk by predicting responses from a number of sets of values of a parameter, randomly selected in a variation range thereof.

10. The method as claimed in claim 2, comprising analyzing a risk by predicting responses from a number of sets of values of a parameter, randomly selected in a variation range thereof.

11. The method as claimed in claim 3, comprising analyzing a risk by predicting responses from a number of sets of values of a parameter, randomly selected in a variation range thereof.

12. The method as claimed in claim 4, comprising analyzing a risk by predicting responses from a number of sets of values of a parameter, randomly selected in a variation range thereof.

13. The method as claimed in claim 5, comprising analyzing a risk by predicting responses from a number of sets of values of a parameter, randomly selected in a variation range thereof.

14. The method as claimed in claim 6, comprising analyzing a risk by predicting responses from a number of sets of values of a parameter, randomly selected in a variation range thereof.

15. The method as claimed in claim 7, comprising analyzing a risk by predicting responses from a number of sets of values of a parameter, randomly selected in a variation range thereof.

16. The method as claimed in claim 8, comprising analyzing a risk by predicting responses from a number of sets of values of a parameter, randomly selected in a variation range thereof.

17. The method as claimed in claim 1, comprising using the global model when the at least one discrete parameter is not controllable.

18. The method as claimed in claim 1, comprising using marginal models for risk analysis when each discrete parameter is controllable and when the global model has not detected any quantitative interaction that cannot be detected by the marginal models.

19. The method as claimed in claim 1, comprising using the global model for risk analysis when each discrete parameter is controllable and when the global model has detected a quantitative interaction that cannot be detected by the marginal models.

20. The method as claimed in claim 1, comprising using the global model and marginal models to determine the respective influence of aliased quantitative and qualitative interactions.

21. The method as claimed in claim 1 wherein the parameters comprise permeability and state of fracture in the reservoir.

22. The method as claimed in claim 2 wherein the parameters comprise permeability and state of fracture in the reservoir.

23. The method as claimed in claim 3 wherein the parameters comprise permeability and state of fracture in the reservoir.

24. The method as claimed in claim 4 wherein the parameters comprise permeability and state of fracture in the reservoir.

25. The method as claimed in claim 5 wherein the parameters comprise permeability and state of fracture in the reservoir.

26. The method as claimed in claim 6 wherein the parameters comprise permeability and state of fracture in the reservoir.

27. The method as claimed in claim 7 wherein the parameters comprise permeability and state of fracture in the reservoir.

28. The method as claimed in claim 8 wherein the parameters comprise permeability and state of fracture in the reservoir.

29. The method as claimed in claim 9 wherein the parameters comprise permeability and state of fracture in the reservoir.

30. The method as claimed in claim 10 wherein the parameters comprise permeability and state of fracture in the reservoir.

31. The method as claimed in claim 11 wherein the parameters comprise permeability and state of fracture in the reservoir.

32. The method as claimed in claim 12 wherein the parameters comprise permeability and state of fracture in the reservoir.

33. The method as claimed in claim 13 wherein the parameters comprise permeability and state of fracture in the reservoir.

34. The method as claimed in claim 14 wherein the parameters comprise permeability and state of fracture in the reservoir.

35. The method as claimed in claim 15 wherein the parameters comprise permeability and state of fracture in the reservoir.

36. The method as claimed in claim 16 wherein the parameters comprise permeability and state of fracture in the reservoir.

37. The method as claimed in claim 17 wherein the parameters comprise permeability and state of fracture in the reservoir.

38. The method as claimed in claim 18 wherein the parameters comprise permeability and state of fracture in the reservoir.

39. The method as claimed in claim 19 wherein the parameters comprise permeability and state of fracture in the reservoir.

40. The method as claimed in claim 20 wherein the parameters comprise permeability and state of fracture in the reservoir.

* * * * *